US006647116B1

(12) United States Patent
Gay (10) Patent No.: US 6,647,116 B1
(45) Date of Patent: Nov. 11, 2003

(54) CURRENT SENSING CIRCUIT AND ADSL INTERFACE CIRCUIT (75) Inventor: Michael J. Gay, Vaud (CH)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/306,521

(22) Filed: May 6, 1999

(30) Foreign Application Priority Data

May 21, 1998 (GB) .............................. 9811010

(51) Int. Cl.[7] ................................. H04M 1/58

(52) U.S. Cl. ................ 379/405; 379/390.04; 379/93.01

(58) Field of Search .................. 379/402, 405

(56) References Cited

U.S. PATENT DOCUMENTS 4,203,012 A * 5/1980 Boxall .................. 379/405
5,515,434 A * 5/1996 Cotreau .................. 379/404

* cited by examiner

Primary Examiner—Forester W. Isen
Assistant Examiner—Daniel Swerdlow

(57) ABSTRACT

A current sensing circuit (50) for use in an ADSL interface circuit senses an input current (IL) flowing through a resistor (R1) and provides an image output signal at an output which is an image of the input current. The circuit comprises an input stage (56) having a first input terminal for coupling to one terminal of the resistor (R1), a second input for coupling to the other terminal of the resistor and first (57) and second (58) output terminals, a first P-type current mirror (60) having an input terminal, an output terminal and a supply terminal, the input terminal being coupled to the first output terminal (57) of the input stage (56) and the supply terminal being coupled to a first supply line, a second N-type current mirror (62) having an input terminal, an output terminal and a supply terminal, the input terminal being coupled to the second output terminal (58) of the input stage (56) and the supply terminal being coupled to a second supply line and combining means (63) coupled to the output terminals of the first and second current mirrors for combining the output signals at the output terminals of the first and second current mirrors to provide the image output signal. The circuit further comprises bias means (R101, R102) for biasing the input stage to operate in class AB such that the input stage provides a transconductance which tends to increase with increasing level of the input current, and offset means (R103, R109, R115) for generating offset voltages in the first and second current mirrors which cause the gains of the current mirrors to tend to reduce with increasing level of the input current such that the combined gains of the input stage and the first and second current mirrors remain substantially independent of the level of the input current.

13 Claims, 4 Drawing Sheets

CURRENT SENSING CIRCUIT AND ADSL INTERFACE CIRCUIT

FIELD OF THE INVENTION

The present invention relates to a current sensing circuit for an Asymmetric Digital Subscriber Line (ADSL) interface circuit and an ADSL interface circuit.

BACKGROUND OF THE INVENTION

An ADSL system transmits data at a high rate over a conventional telephone line. To do this, it employs a frequency band from 26 kHz to 1.108 MHz. This band is divided into sub-bands of 4.35 kHz width, each of which is modulated in a Quadrature Amplitude Modulated (QAM) pattern to carry up to 15 bits of data. The data is refreshed at 250 micro-second intervals.

The intensive signal processing required for such data communication is performed in dedicated DSP integrated circuits. These circuits, which require several million transistors, are constructed with very high density integrated circuit processes, which processes can only support low voltages e.g. 3.3 V. An ADSL interface circuit provides the interface between the low voltage DSP circuits and the telephone line.

In order to provide adequate signals at the receiving end of the telephone lines, which may be several kilometers long, the ADSL signal at the transmit end must be relatively large. Typical specifications require an average power level of 20 dBm on a 100 Ω line, which means the ADSL signal must be 3.16 Vrms and 31.6 mArms. The true requirement is, however, more stringent because the ADSL signal may have peak values which are very much higher than the rms level. In fact, the peak is typically limited at a value which is significantly below the theoretical maximum, but which, the signal statistics show, will be exceeded with an acceptably low probability. In a known case, this level is 17 dB above the rms voltage, i.e. 22.4 Vpk, which will, of course generate 224 mApk current.

The high density DSP circuit will normally comprise distinct paths for transmit and receive signals. The two-wire telephone line, however, must carry these signals simultaneously. In order to separate the received signal from the transmitted signal, the ADSL interface circuit therefore includes a hybrid balance circuit which should be arranged so that in operation there is matching between a reference impedance determined by the interface circuit and that of the telephone line.

The ADSL interface circuit must also present a definable impedance to the telephone line, both to preserve a correct frequency response in the transmit and receive paths and to ensure, in some conditions, that the impedance presented at the other end of the telephone line is well defined.

The high frequency channels of the ADSL signal may be considerably attenuated on long telephone lines. They are consequently very sensitive to degradation by spurious signals which could be generated from the lower frequency channels by intermodulation distortion.

Taking all the above into account, there is therefore a need for an ADSL interface circuit which can accept a data signal from a low voltage circuit, amplify and transmit the data signal at a high voltage level via a telephone line and which can simultaneously receive a high voltage level data signal from the telephone line, adjust the received signal to an appropriate level and transmit it to the low voltage circuit.

In addition, the ADSL interface circuit should have very low distortion and should provide impedance matching and a definable impedance to the telephone line.

The requirements of the ADSL interface circuit are similar to those of the Subscriber Line Interface Circuits (SLIC's). Examples of SLIC arrangements can be found in European patent application no. EP-A-467367 and US Pat. No. 4,622,442. SLICs are used for voice communication systems and therefore do not address the specific requirements associated with communicating data at high data rates. For example, SLICs do not have stringent requirements for low distortion at high frequencies which means that they are able to reconstitute line current signals which are required, together with the line voltage signals, to generate the aforementioned defined impedances from images of the currents of a plurality of class AB output stages. This technique for sensing the line current signals would be inadequate for an ADSL interface circuit because the matching required could not be maintained over the frequency band, due to the large operating current range of the class AB output stages and their differing stray capacitances.

Implementing such a circuit with discrete passive components, for example using a resistor coupled across the line to achieve impedance matching, is also not a satisfactory solution because of the amount of power which would be consumed by such a solution.

Classic hybrid balance circuits, for example those used in telephone handsets, are DC coupled to the telephone line and thus cannot be used in an ADSL system which, because the system is coupled to the mains supply, requires a transformer to couple the interface circuit to the line.

SUMMARY OF THE INVENTION

In accordance with the present invention there is provided a current sensing circuit as recited in claim 1 of the accompanying claims.

BRIEF DESCRIPTION OF THE DRAWINGS

An ADSL interface circuit in accordance with the present invention and a current sensing circuit for an ADSL interface circuit in accordance with the present invention will now be described, by way of example only, with reference to the accompanying drawings in which.

DETAILED DESCRIPTION OF THE DRAWINGS

Figure 1:
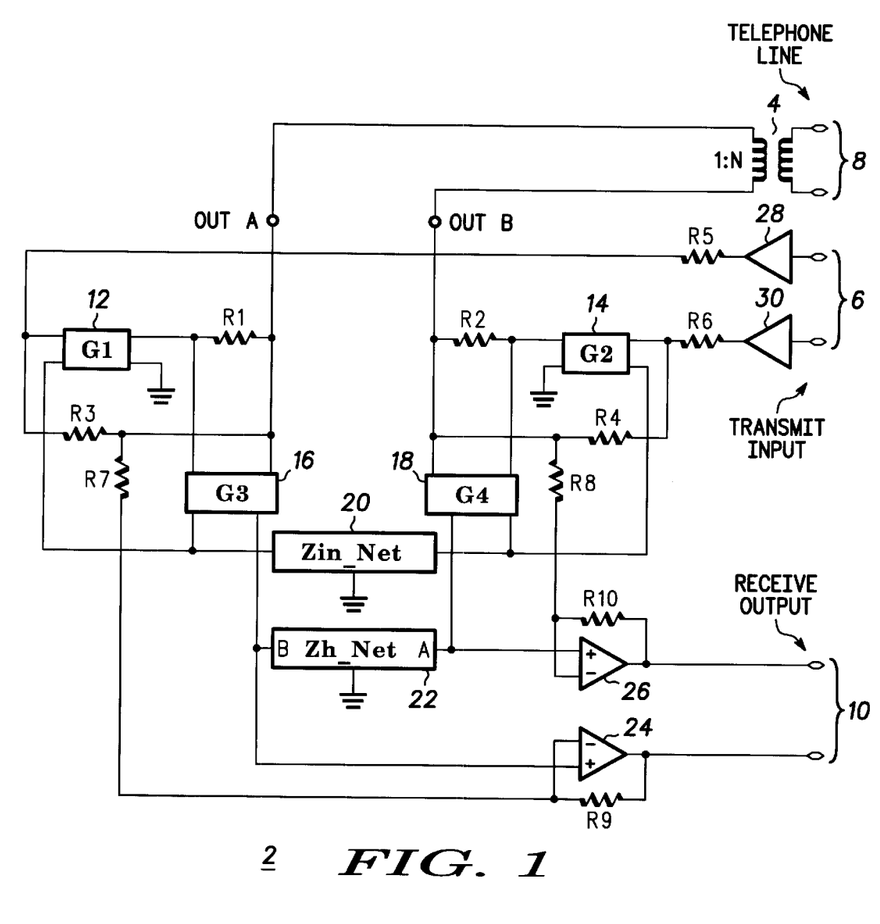
FIG. 1 is a schematic circuit diagram of an ADSL interface circuit in accordance with the present invention.

Referring firstly to FIG. 1, an ADSL interface circuit 2 in accordance with a preferred embodiment of the present invention has a first port 6 for receiving signals from low voltage signal processing circuits (not shown), such as DSP circuits, a second port 8 for coupling to a telephone line (not shown) via a transformer 4 and a third port 10 for transmitting signals received from the telephone line to the low voltage signal processing circuits (not shown). In the preferred embodiment, the ports 6, 8 and 10 are all differential. The telephone line itself is differential and the low voltage DSP circuits, with which this ADSL interface circuit 2 might be used, are also commonly fully differential.

The ADSL interface circuit 2 comprises two high voltage, high current, high gain transconductors 12, 14, two current sensing circuits 16, 18 which are preferably two matched transconductance circuits, having defined transconductances G3, G4 respectively, two unity gain buffers 28, 30, two operational amplifiers 26, 24 resistors R1–R10 and passive networks 20, 22, which are preferably balanced with respect to their ground reference terminals, C. The resistors are matched in pairs: that is, R1 with R2, R3 with R4, R5 with R6, R7 with R8 and R9 with R10.

The transconductors 12 and 14 are embedded in series voltage feedback networks and in a differential series current feedback network. For transconductor 12, the series voltage feedback network comprises resistors R3 and R5 and for transconductor 14, this series voltage feedback network comprises resistors R4 and R6. The differential series current feedback network comprises current sense resistors R1 and R2, the current sensing circuits 16, 18 and the passive network 20. The outputs of transconductors 12 and 14 are coupled to the telephone line via the transformer 4.

The signals from the DSP circuits are coupled via the buffers 28, 30 to first terminals of the resistors R5 and R6, respectively. The second terminals of resistors R5 and R6 are connected to the inverting inputs of transconductors 12 and 14, to which are also connected the first terminals of resistors R3 and R4, respectively. The second terminals of resistors R3 and R4 are coupled to the outputs of transconductors 12 and 14, respectively.

The operation of the ADSL circuit in accordance with the present invention will now be described. In order to simplify the explanation, the loading of the transconductors 12 and 14 by the resistors R3, R4, R5, R7 has been neglected. Furthermore, it is assumed that the transformer 4 is ideal. The effects neglected are, desirably, made small, but can readily be included in a full analysis.

If the telephone line is open, the voltage gain from the first port 6 to the second port 8 is given by:

$$M_{21} = \frac{R3 + R4}{R5 + R6} N \tag{1}$$

where N is the transformer's 4 turns ratio defined as the number of turns on the line, or secondary, side divided by the number of turns on the interface, or primary, side.

In reality, the interface circuit 2 supplies current to the line via the transformer 4. The current flowing in the primary of the transformer 4 will flow through current sense resistors R1 and R2 The current sensing circuits 16 and 18 generate output currents which are nominally equal, and in anti-phase and which are images of the currents flowing through current sense resistors R1 and R2, respectively. The current sourced by current sensing circuit 16 and sunk by current sensing circuit 18, or vice-versa, will develop a differential voltage between the terminals A, B of the passive network 20. This voltage applied between the non-inverting inputs of transconductors 12 and 14 will reduce the signals at the output of the transconductors 12 and 14 and hence the output signal on the primary side. The ADSL interface circuit thus presents a finite impedance, ZIN to the telephone line. The impedance $Z_{IN}$ can be shown to be given by:

$$Z_{IN} = N^2 \left\{ R_1 G_3 \left(1 + \frac{R_3}{R_5}\right) Z_{inAC} + R_2 G_4 \left(1 + \frac{R_4}{R_6}\right) Z_{inBC} \right\} \tag{2}$$

where $Z_{inAC}$ is the impedance presented between the terminals A, C of the passive network 20 with terminal B open and $Z_{inBC}$ is the impedance presented between the terminals B, C of the passive network 20 with terminal A open.

If the pairs of components are matched, i.e. G3=G4, R1=R2, R3=R4 etc., and the passive network 20 is balanced with respect to terminal C, equation (2) simplifies to:

$$Z_{IN} = N^2 R_1 G_3 \left(1 + \frac{R_3}{R_5}\right) Z_{INAB} \tag{3}$$

$$Z_{IN} = N^2 Z_{INAB} P1$$

where:

$$P1 = R_1 G_3 \left(1 + \frac{R_3}{R_5}\right)$$

ZinAB is the impedance presented between the terminals A, B of the passive network 20 with terminal C open.

The product P1 can be entirely defined by resistor ratios and thus, precisely maintained in an integrated circuit (IC). The impedance presented to the telephone line will then be a precisely scaled version of the passive network 20. The passive network 20 will usually be external to the IC incorporating the ADSL interface circuit allowing easy adaptation to different requirements.

For transmission of signals from the first port 6 to the second port 8, the ADSL interface circuit 2 therefore presents itself as a voltage amplifier with an open circuit gain of:

$$\frac{R_3 + R_4}{R_5 + R_6} N \tag{4}$$

and an output series impedance $Z_{IN}$ which is defined by the passive network 20.

While the signal applied to the first port 6 should be transmitted to the telephone line, it should not be transmitted to the third port 10. The ADSL interface circuit 2 in accordance with the present invention meets this requirement by cancelling, in the signal path from the second port 8 to the third port 10, the signal due to the voltage at the second port 8 with the signal due to the current flowing through the second port 8.

Figure 2:
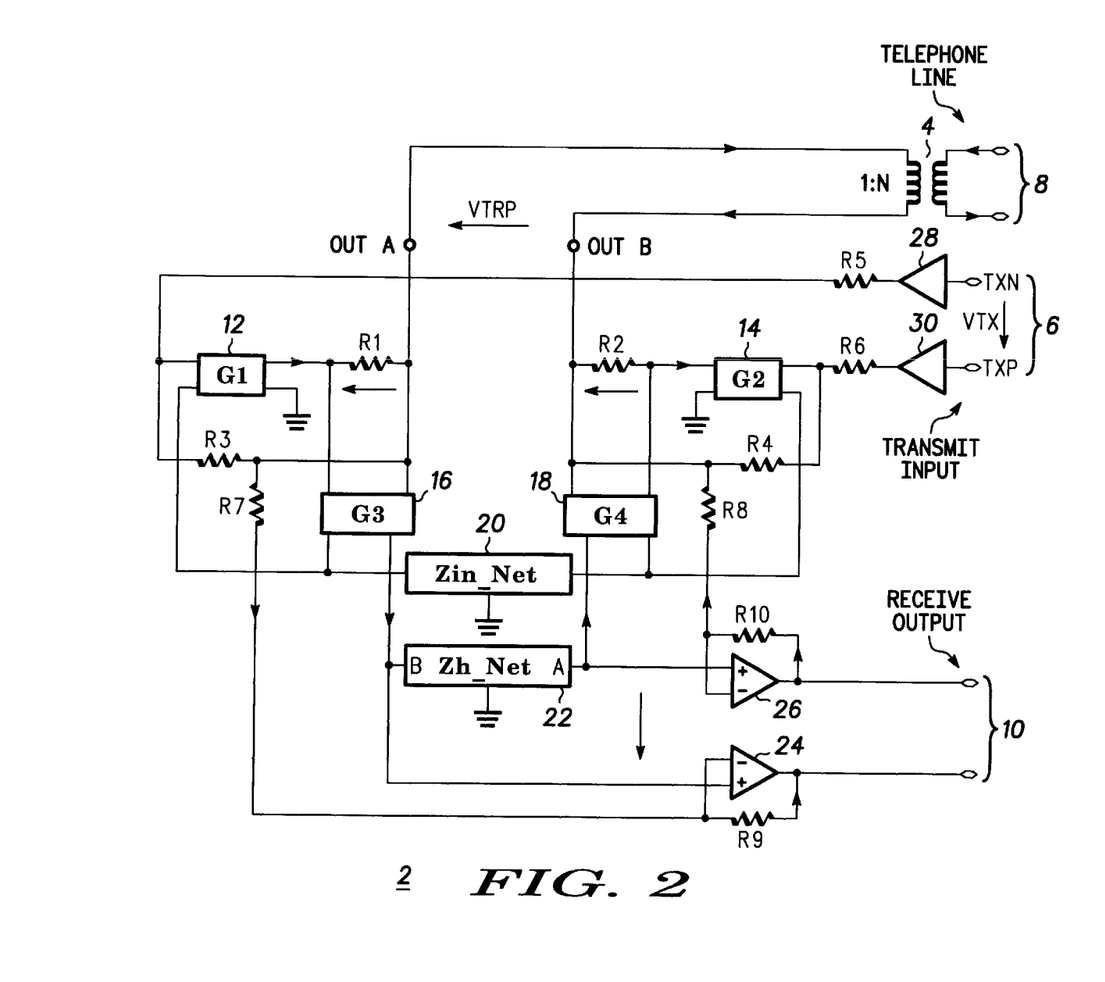
FIG. 2 is the ADSL interface circuit of FIG. 1 but also showing the phasing of different signals in the circuit for a transmitted signal.

FIG. 2 shows the relative senses of the current and voltage signals when a signal is applied to the first port 6, with terminal TXP of the first port 6 being positive with respect to terminal TXN. Since transconductors 12 and 14 are connected in inverting configurations, the voltage at the node OUT A will be positive with respect to that at the node OUT B. The voltage signal, VTRP, developed between these points and coupled via resistors R7, R8 to the operational amplifiers 24, 26, respectively will produce a first component of the output signal at the third port 10 as set out below, with terminal RXN of the third port 10 being positive with respect to terminal RXP.

$$V_{TRP} \frac{R_9 + R_{10}}{R_7 + R_8}$$

The voltage signal VTRP causes a current to flow in the primary of transformer 4 and hence through current sense resistors R1 and R2. The current sensing circuits 16 and 18 generate output currents which are nominally equal, and in anti-phase and which are images of the currents flowing through current sense resistors R1 and R2, respectively. The current sourced by current sensing circuit 16 and sunk by current sensing circuit 18, or vice-versa, will develop a differential voltage between the terminals A, B of the passive network 22. This voltage, applied between the non-inverting inputs of operational amplifiers 24, 26 respectively, generates a second component of the output signal at the third port 10. For this second component however, the terminal RXP would be positive with respect to the terminal RXN.

The first and second components of the output signal produced at the third port 10 in response to a signal applied at the first port 6 therefore tend to cancel. It can be shown from linear circuit analysis that this cancellation is exact, for a telephone line impedance $Z_L$, when:

$$(R_1 G_3 Z_{hAC} + R_2 G_4 Z_{hBC})\left(1 + \frac{R_7 + R_8}{R_9 + R_{10}}\right) = \frac{Z_L}{N^2} \quad (5)$$

where $Z_{hAC}$ is the impedance presented between the terminals A, C of the passive network 22 with terminal B open and $Z_{hBC}$ is the impedance presented between the terminals B, C of the passive network 22 with terminal A open.

If the pairs of components are matched, i.e. G3=G4, R1=R2, R7=R8 etc., and the passive network 22 is balanced with respect to the terminal C, equation (5) simplifies to:

$$Z_{hAB} = \frac{Z_L}{N^2 R_1 G_3 \left(1 + \frac{R_7}{R_9}\right)} \quad (6)$$

$$Z_{hAB} = \frac{Z_L}{N^2 P2}$$

where $$P2 = R_1 G_3 \left(1 + \frac{R_7}{R_9}\right)$$

$Z_{hAB}$ is the impedance presented between the terminals A, B of the passive network 22 with terminal C open.

The product P2 can be entirely defined by resistor ratios and thus precisely maintained in an IC. The passive network 22 required to cancel the output signal at the third port 10 when a signal is applied to the first port 6, achieving so-called hybrid balance, is therefore a precisely scaled model of the telephone line impedance $Z_L$. The passive network 22 will usually be external to the IC on which the ADSL interface circuit 2 is integrated allowing easy adaptation to different requirements.

Figure 3:
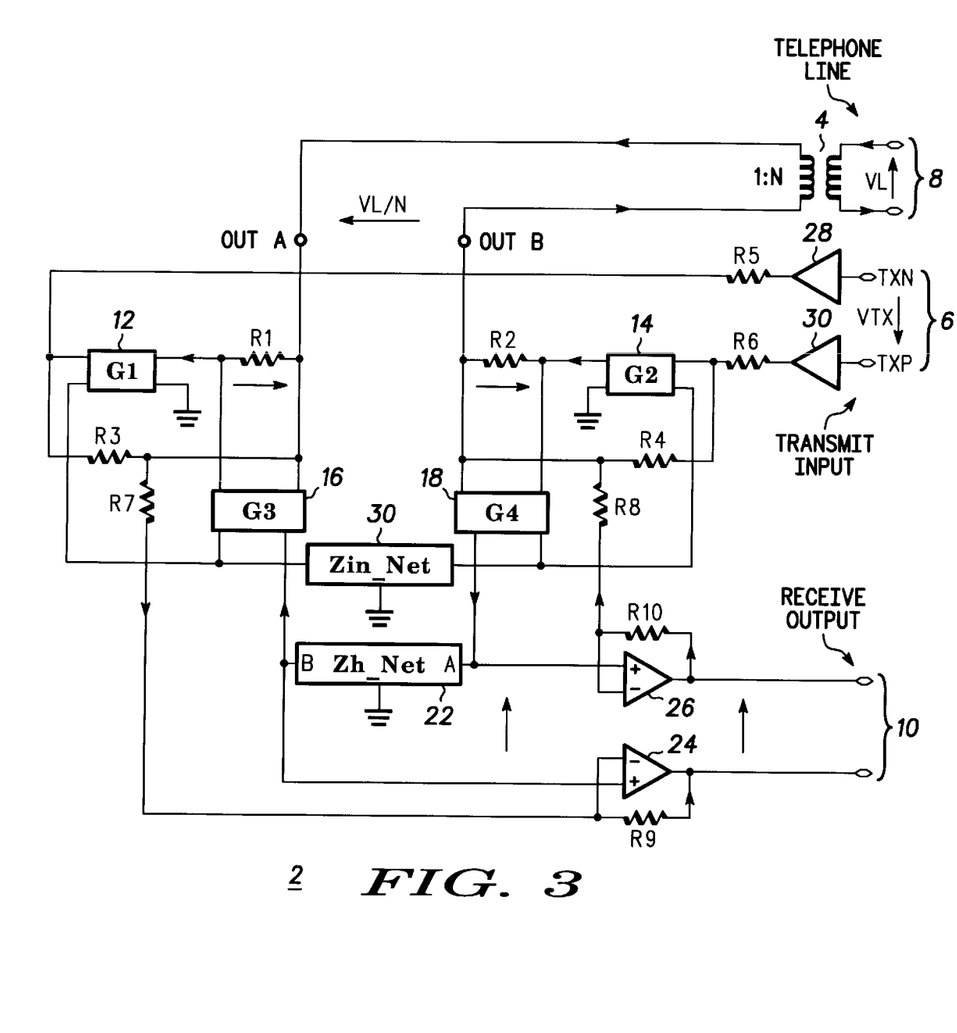
FIG. 3 shows the circuit of FIG. I but also showing the phasing of different signals in the circuit for a received signal.

A signal originating from the telephone line is required to produce an output signal at the third port 10. It also produces two components at the third port 10, a first component due to the voltage developed between node OUT A and node OUT B and a second component due to the current absorbed by the transconductors 12 and 14. However, while the two components subtract for a signal originating from the DSP circuits and applied to the first port 6, they add in this case. This is because, for a given sense of the voltage between node OUT A and node OUT B, the current flows through the primary of the transformer 4 in opposite senses dependent on whether the signal originates from the DSP circuits or from the line. The relative phasing of the voltages and currents with a signal originating from the telephone line are shown in FIG. 3.

It can be shown by linear circuit analysis that the signal $V_{RX}$ received at the third port 10 in response to an input signal $V_L$ at the secondary of the transformer 4 is given by:

$$V_{RX} = \qquad (7)$$

$$\left(\frac{V_L}{N}\right)\left(\frac{R_9 + R_{10}}{R_7 + R_8}\right) + \frac{NV_L}{Z_{IN}}(R_1 G_3 Z_{hAC} + R_2 G_4 Z_{hBC})\left(1 + \frac{R_9 + R_{10}}{R_7 + R_8}\right)$$

Equation (7) can be simplified by substitution from equation (5) to:

$$V_{RX} = \frac{V_L}{N}\left(1 + \frac{Z_H}{Z_{IN}}\right)\frac{R_9 + R_{10}}{R_7 + R_8} \quad (8)$$

where $Z_H$ is the value of the line impedance for which hybrid balance is obtained.

From the above analysis, the ADSL interface circuit 2 in accordance with the present invention thus provides:

i) a defined gain (see equation 4) from the transmit input port, the first port 6, to the telephone line port, the second port 8;

ii) presents an impedance defined by the passive network 20 at the telephone line port 8 (see equation 3); and iii) provides a defined gain from the telephone line port 8 to the receive port, third port 10 (see equation 8) and provides hybrid balance for a line impedance defined by the passive network 22 (see equation 6).

With the ADSL interface circuit in accordance with the present invention, the current sense resistors R1 and R2 are in series with the load (i.e. the transformer 4) so that the output currents in the primary are sensed directly by the current sensing circuits 16, 18, to avoid the sources of distortion inherent in other methods. The current sense resistors R1 and R2 will normally be small compared to the load to limit the power losses. The invention's arrangement provides a significant improvement on power consumption compared to the prior art techniques of coupling a resistor in parallel to the primary as discussed in the introduction. If the current sense resistors R1 and R2 are made too small, however, the signal/noise ratio of the system will be degraded.

Figure 4:
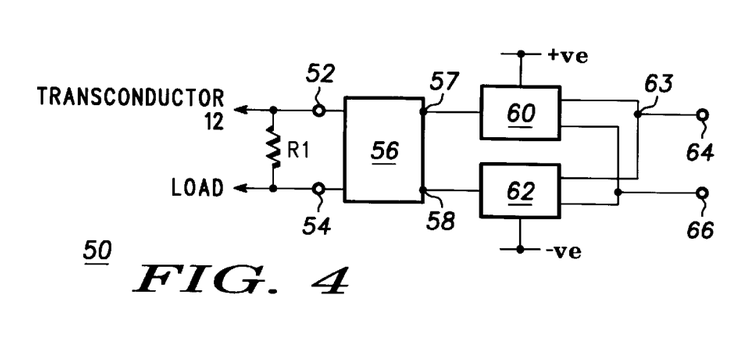
FIG. 4 is a block schematic diagram of a current sensing circuit in accordance with the present invention for an ADSL interface circuit.

FIG. 4 shows a current sensing circuit 50 in accordance with a preferred embodiment for use as the current sensing circuit 16 in the ADSL interface circuit 2. The current sense resistor R1 is included for clarity.

The current sensing circuit 50 comprises a first input 52 coupled to a first terminal of the current sense resistor R1 and a second input 54 coupled to a second terminal of the current sense resistor R1. The first terminal of current sense resistor R1 is coupled to the output of the transconductor 12 and the second terminal of the current sense resistor R1 is coupled to the load (primary of transformer 4). The primary current $I_L$ thus flows through the current sense resistor R1 producing a voltage $I_L R1$.

The first and second inputs 52, 54 are, respectively, coupled to the first and second inputs of a transconductor input stage 56. The transconductor input stage 56 sinks a first output current at node 57 and sources a second output current at node 58. It is so designed that the difference of the output currents is precisely proportional to the differential input voltage between nodes 52 and 54.

Node 57 is coupled to the positive supply line via a first current mirror 60 and node 58 is coupled to the negative supply line via a second current mirror 62. The outputs of these current mirrors are subtracted to provide the final output at node 63 which is an image of the primary current $I_L$ flowing through the current sense resistor R1.

The resistor R1 is small compared to the circuit's load, so the input voltage to the transconductor input stage 56 will be a small part of the total output signal. As the outputs of the transconductor input stage 56 are connected to the supply lines via current mirrors, it will be understood that the circuit can be designed to operate over a very large common mode input voltage range.

The transconductor input stage 56 preferably operates in class AB. That is, at low signal levels both outputs are active, one current increasing while the other decreases by a similar amount while, at high signal levels, as one current approaches zero, the variation is provided essentially by the other. Using a class AB stage reduces power consumption.

In the class B operating regions, the output signal is provided predominantly by the first or second output of the transconductor input stage 56, according to the output current sense. Mismatch between the first 60 and second 62 current mirrors then produces distortion. This is not the case in the class A region where the output signal is provided by equal and opposite incremental changes in the two outputs and both current mirrors are active. The quiescent bias of the transconductor input stage 56, which determines the boundary of class A operation, must therefore be set at a level which ensures low enough distortion based on the statistics of the signal and those of the current mirror matching.

In the preferred embodiment, the ADSL interface circuit output current flows through the current sense resistor R1, and not through the current sensing circuit 50. The current sensing circuit 50, furthermore, provides only small output signals. The class A boundary may thus be set relatively high without producing excessive power consumption and dissipation.

In the ADSL interface circuit 2, two output signals are required: one for coupling to the passive network 22 for achieving hybrid balance and one for coupling to the passive network 20 for achieving impedance matching. Thus, in the preferred embodiment a second output signal is also provided at a second output 66. The second output signal is also an image of the primary current $I_L$ flowing through the current sense resistor R1 and has the same phase as the first output signal.

Figure 5:
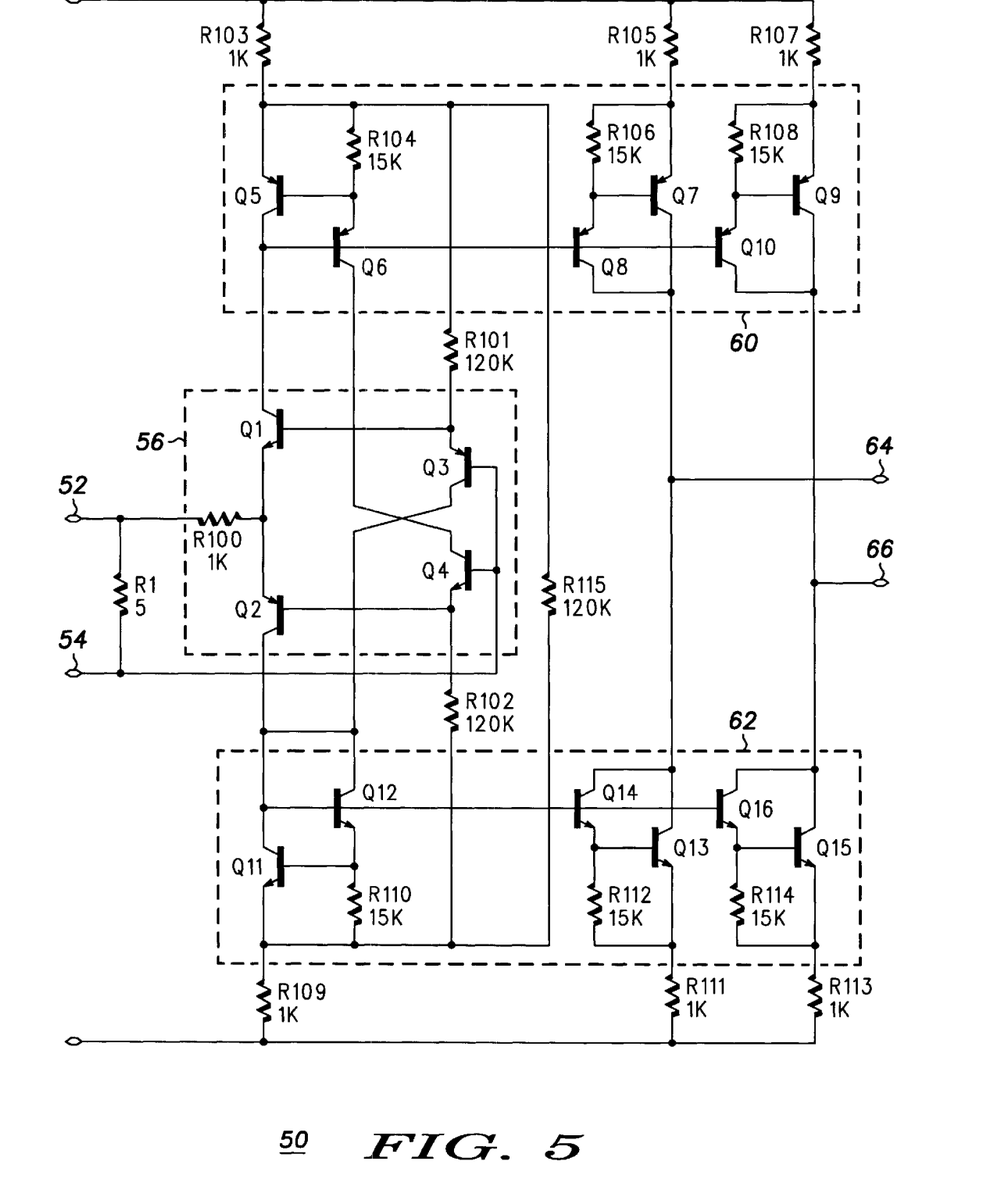
FIG. 5 is a more detailed circuit diagram of the current sensing circuit of FIG. 4.

FIG. 5 shows the current sensing circuit 50 in a more detail. Typical resistor values are shown for clarity.

Transistors Q1–Q4 and resistor R100 form the transconductor input stage 56. In the preferred embodiment, transistors Q1 and Q4 are NPN transistors and transistors Q2 and Q3 are PNP transistors.

Transistors Q5–Q10, which in the preferred embodiment are PNP transistors, form the first, two output, current mirror 60 and the transistors Q11–Q16, which in the preferred embodiment are NPN transistors, form the second, two output, current mirror 62.

The current $I_L$ fed to the transformer 4 flows through the current sense resistor R1. A first electrode of this resistor R1 is connected to node 52, which is coupled to the output of the high current transconductor 12 and connected to a first electrode of the resistor 100. The second electrode of resistor R100 is connected to the emitters of transistors Q1 and Q2. The bases of these transistors are connected respectively to the emitters of transistors Q3, Q4. The bases of transistors Q3, Q4 are connected together and to the second electrode of resistor R1 at node 54, which is coupled to the primary of the transformer 4 (i.e. the load). The collectors of transistors Q1, Q4 are connected to the input of the first current mirror 60 and the collectors of transistors Q2, Q3 are connected to the input of the second current mirror 62. Output currents from each current mirror are combined to provide images of the input current $I_L$ at the outputs 64 and 66 respectively. An offset voltage is generated across the resistors R103, R109 of the current mirrors 60, 62, respectively, in response to the current through resistor R115.

The operation of the current sensing circuit 50 is as follows.

Transistor Q3 is biased at a quiescent current supplied via resistor R101. This current is approximately equal to the positive supply voltage less the circuit quiescent output voltage at node 54, divided by the value of resistor R101. Likewise transistor Q4 is biased at a quiescent current supplied via resistor R102. This current is approximately equal to the circuit quiescent output voltage at node 54 less the negative supply voltage, divided by the value of resistor R102. The bias voltage developed between the emitters of transistors Q3, Q4 is applied between the bases of transistors Q1, Q2. The quiescent current produced in transistors Q1, Q2 is thus essentially determined by the quiescent currents in transistors Q3, Q4 and by the relative areas of the transistors.

Spurious signal currents flows through resistor R101, transistor Q3, transistor Q4 and resistor R102, in response to the common mode voltage applied at nodes 52 and 54 and generate a further spurious signal current which flows through transistors Q1, Q2. The output currents produced by these common mode currents essentially cancel. The collector current of transistor Q1 inverted by the first current mirror 60 cancels the collector current of Q2 inverted by the second current mirror 62. Likewise the collector current of transistor Q3 cancels that of transistor Q4 and the current through the resistor R10 cancels that through the resistor R102. The circuit is therefore insensitive to the common mode input voltage even though the bias currents are defined by resistors coupled to the supply lines.

Resistors R101, R102 could be coupled to the inputs of the first and second current mirrors 60, 62, that is to the bases of transistors Q6, Q12. The connection to the emitters of transistors Q5, Q11 is preferred for reasons discussed below.

The signal voltage developed across resistor R1 in response to a current supplied form the high current transconductor 12 to the load is applied between the first electrode of resistor R100 and the bases of transistors Q3, Q4. The input current which flows through resistor R1 in response to the signal voltage divides between the emitters of transistors Q1 and Q2.

The collector current of transistor Q1 is fed to the first current mirror 60, while the base current is fed via transistor Q3 to the second current mirror 62. Likewise the collector current of transistor Q2 is fed to the second current mirror 62, while the base current is fed via transistor Q4 to the first current mirror 60.

A first output from the first current mirror 60 is combined with a first output from the second current mirror 62 to provide a first combined output at node 64. Likewise a second output from the first current mirror 60 is combined with a second output from the second current mirror 62 to provide a second combined output at node 66. In the preferred embodiment the two combined outputs are similar but they need not be so.

It will be seen that the part of the signal current through resistor R100 which flows as base currents in the transistors Q1, Q2 is returned to the output via transistors Q3, Q4 and the corresponding first and second current mirrors 60, 62. Only negligibly small signal currents flowing in the bases of transistors Q3, Q4 are lost.

This method of returning the base current components to the outputs avoids the high frequency performance problems of the conventional compound transistor configurations, in which the collectors of transistors Q3, Q4 would return to the emitters of transistor Q1 and Q2 respectively and requires less voltage overhead than would be required were transistors Q1 and Q2 replaced by Darlington transistors.

The current signal fed to the high current transconductor 12 via resistor R100 is reduced due to the voltage it produces between the emitters of transistors Q1, Q2 and the bases of transistor Q3, Q4. As is well known, this voltage is a non-linear function of the transistor currents, so a small degree of distortion is also introduced, the signal being less reduced at high levels than at low levels.

The effects are cancelled by the offset voltages developed across resistor R103 and resistor R109 in response to the current through resistor R115. These offsets cause the quiescent currents in transistors Q7, Q9 to be higher than that in transistor Q5 and the quiescent currents in transistor Q13, Q15 to be higher than that in transistor Q11. The corresponding relative reduction of the emitter resistances of transistors Q7, Q9 and transistors Q13, Q15 compared with transistors Q5, Q1 causes the gain of the first and second current mirrors to be slightly larger than unity and to be larger under quiescent conditions than under large signal conditions.

The non-linearity induced in the first and second current mirrors by the offset does not track exactly with non-linearity produced by the emitter resistances of transistors Q1, Q2. There are consequently several possible criteria for the optimisation of the performance, leading to different choices for the offset.

One option is calculated as follows.

The quiescent currents in transistors Q1, Q2 are substantially equal at a value $I_1$, say. Using well known expressions for the small signal emitter resistance of a bipolar transistor, the input voltage produced by a small input signal i flowing through resistor R100 and dividing between the transistors Q1, Q2 is then given by:

$$v = iR_{100} + \frac{kT}{2qI_1} \tag{9}$$

Due to the non-linearity of the base-emitter voltage, for large input signal levels this tends to:

$$v = iR_{100}$$

For small input signal levels, the current signal, say ii, in the collector of transistor Q1 produced by the small input current i, provides an output component at node 64 which is given by:

$$i_1 \frac{R_{103} + \frac{kT}{qI_5}}{R_{105} + \frac{kT}{qI_7}} \tag{10}$$

where $I_5$, $I_7$ are the quiescent currents in transistors Q5, Q7 respectively.

Due to the non-linearity of the base-emitter voltage of bipolar transistors, for large input signals the current ratio tends to:

$$\frac{R_{103}}{R_{105}}$$

To equalise the large-signal and small-signal gains, the following equation must be satisfied:

$$\frac{R_{103} + \frac{kT}{qI_5}}{\left(R_{100} + \frac{kT}{2qI_1}\right)\left(R_{105} + \frac{kT}{qI_7}\right)} = \frac{R_{103}}{R_{100}R_{105}} \tag{11}$$

In the preferred embodiment resistors R100, R013, R105 are equal and much larger than the emitter resistance components in the above equation. The equality is then satisfied to a good approximation if:

$$I_7 = \frac{2I_1 I_5}{2I_1 - I_5}$$

Similarly, to match the small signal and large signal gains in the path via transistor Q2, the following is required:

$$I_{13} = \frac{2I_1 I_{11}}{2I_1 - I_{11}}$$

where $I_{11}$, $I_{13}$ are the quiescent currents of transistors Q11, Q13 respectively.

The optimisation described matches the large signal and small signal gains. The non-linearity induced in the current mirrors, however, over compensates for signals of intermediate level. Lower overall distortion is therefore obtained by under compensating the large signal gain.

In the preferred embodiment, $I_1$ is 0.4 mA and the equations set out above indicate that $I_7$, $I_{13}$ should be 1.03 mA. Simulations with typical ADSL signals showed optimum performance for currents of 0.8 mA.

This value is obtained with resistors R115, R101, R102 all being equal.

Resistors R101 and R102 are connected to the emitters of transistors Q5, Q11 respectively, rather than to the current mirror inputs so that the currents flowing through them contribute to generating the desired current mirror offsets.

Although described with reference to the current sensing circuit 16 of FIG. 1, since the current sensing circuits 16 and 18 match, it will be appreciated that an identical current sensing circuit 50 will be used to implement the current sensing circuit 18.

In summary, the current sensing circuit in accordance with the present invention provides a circuit with low noise and low distortion which is capable of operating with a relatively low input voltage and over a common mode input range approaching the positive and negative supply lines. When used in the ADSL interface circuit 2, such a circuit allows the maximum voltage excursion at the outputs of the transconductors 12 and 14.

What is claimed is:

1. A current sensing circuit for sensing an input current flowing through a resistor and for providing an image output signal at an output which is an image of the input current, the circuit comprising:

an input stage having a first input terminal for coupling to one terminal of the resistor, a second input for coupling to the other terminal of the resistor and first and second output terminals;

a first P-type current mirror having an input terminal, an output terminal and a supply terminal, the input terminal being coupled to the first output terminal of the input stage and the supply terminal being coupled to a first supply line;

a second N-type current mirror having an input terminal, an output terminal and a supply terminal, the input terminal being coupled to the second output terminal of the input stage and the supply terminal being coupled to a second supply line;

combining means coupled to the output terminals of the first and second current mirrors for combining the output signals at the output terminals of the first and second current mirrors to provide the image output signal;

bias means for biasing the input stage to operate in class AB such that the input stage provides a transconductance which tends to increase with increasing level of the input current; and offset means for generating offset voltages in the first and second current mirrors which cause the gains of the current mirrors to tend to reduce with increasing level of the input current such that the combined gains of the input stage and the first and second current mirrors remain substantially independent of the level of the input current.

2. A current sensing circuit as claimed in claim 1 wherein each of the first and second current mirrors comprises:

a first stage comprising an input transistor having first and second current electrodes and a control electrode, the second current electrode being coupled to the control electrode and to the input terminal, the first current electrode being coupled to a respective one of the first and second supply lines; and a second stage comprising an output transistor having first and second current electrodes and a control electrode, the control electrode being coupled to the input terminal, the first current electrode being coupled to a respective one of the first and second supply lines and the second current electrode being coupled to the output of the current sensing circuit.

3. A current sensing circuit as claimed in claim 2 wherein the offset means comprises:

a first input ballast resistor coupled between the first current electrode of the input transistor of the first current mirror and the first supply line; and a second input ballast resistor coupled between the first electrode of the input transistor of the second current mirror and the second supply line.

4. A current sensing circuit as claimed in claim 3 further comprising:

a first output ballast resistor coupled between the first current electrode of the output transistor of the first current mirror and the first supply line; and a second output ballast resistor coupled between the first electrode of the output transistor of the second current mirror and the second supply line.

5. A current sensing circuit as claimed in claim 1 wherein the input stage comprises:

a first transistor having first and second current electrodes and a control electrode, the first current electrode being coupled to the first input terminal, and the second current electrode being coupled to the first output terminal;

a second transistor having first and second current electrodes and a control electrode, the first current electrode being coupled to the first input terminal, and the second current electrode being coupled to the second output terminal;

a third transistor having first and second current electrodes and a control electrode, the first current electrode being coupled to the control electrode of the first transistor, the second current electrode being coupled to the second output terminal and the control electrode being coupled to the second input terminal; and a fourth transistor having first and second current electrodes and a control electrode, the first current electrode being coupled to the control electrode of the second transistor, the second current electrode being coupled to the first output terminal and the control electrode being coupled to the second input terminal.

6. A current sensing circuit according to claim 1 wherein the first current mirror has a second output terminal and the second current mirror has a second output terminal, wherein the circuit further comprises second combining means coupled to the second output terminals of the first and second current mirrors for combining the output signals at the second output terminals of the first and second current mirrors to provide the image output signal.

7. An ADSL interface circuit for providing interface between a telephone line having an impedance and a low voltage circuit comprising:

a first port for coupling to a transmit port of the low voltage circuit;

a second port for coupling to the telephone line;

a third port for coupling to a receive port of the low voltage circuit;

first and second output stages, each output stage having an output coupled to the second port in series with a current sense resistor, and a first input coupled to the first port;

first current sensing circuit coupled across the current sense resistor of the first output stage and a second current sensing circuit coupled across the current sense resistor of the second output stage, the first and second current sensing circuits for providing image output signals at outputs which are images of the current signals flowing in the current sense resistors;

a first passive network coupled to the outputs of the first and second current sensing circuits and to second inputs of the first and second output stages, wherein the first and second output stages, the first and second current sensing circuits and the first passive network form current responsive negative feedback loops, and wherein the first passive network is arranged so that the gain between the first port and the second port is defined and that the impedance presented at the second port is defined and variable;

a second passive network coupled to the outputs of the first and second current sensing circuits and to the third port, the second passive network being arranged to have a predefined relationship with the impedance of the telephone line such that, in operation, two components forming a signal at the third port cancel when the ADSL interface circuit is excited by a signal applied at the first port and combine additively when the ADSL interface circuit is excited by a signal received at the second port.

8. An ADSL interface circuit for providing an interface between a telephone line having an impedance and a low voltage circuit comprising:

a first port for coupling to a transmit port of the low voltage circuit;

a second port for coupling to the telephone line;

a third port for coupling to a receive port of the low voltage circuit;

first and second output stages, each output stage having an output coupled to the second port via a current sense resistor, and a first input coupled to the first port;

first current sensing circuit coupled across the current sense resistor of the first output stage and a second current sensing circuit coupled across the current sense resistor of the second output stage, the first and second current sensing circuits for providing image output signals at outputs which are images of the current signals flowing in the current sense resistors;

a first passive network coupled to the outputs of the first and second current sensing circuits and to second inputs of the first and second output stages, wherein the first and second output stages, the first and second current sensing circuits and the first passive network form current responsive negative feedback loops, and wherein the first passive network is arranged so that the gain between the first port and the second port is defined and that the impedance presented at the second port is defined and variable;

a second passive network coupled to the outputs of the first and second current sensing circuits and to the third port, the second passive network being arranged to have a predefined relationship with the impedance of the telephone line such that, in operation, two components forming a signal at the third port cancel when the ADSL interface circuit is excited by a signal applied at the first port and combine additively when the ADSL interface circuit is excited by a signal received at the second port, wherein the first and second current sensing circuits each comprises a current sensing circuit comprising:

an input stage having a first input terminal for coupling to one terminal of the current sense resistor, a second input for coupling to the other terminal of the current sense resistor and first and second output terminals;

a first P-type current mirror having an input terminal, an output terminal and a supply terminal, the input terminal being coupled to the first output terminal of the input stage and the supply terminal being coupled to a first supply line;

a second N-type current mirror having an input terminal, an output terminal and a supply terminal, the input terminal being coupled to the second output terminal of the input stage and the supply terminal being coupled to a second supply line;

combining means coupled to the output terminals of the first and second current mirrors for combining the output signals at the output terminals of the first and second current mirrors to provide the image output signal;

bias means for biasing the input stage to operate in class AB such that the input stage provides a transconductance which tends to increase with increasing level of the input current; and offset means for generating offset voltages in the first and second current mirrors which cause the gains of the current mirrors to tend to reduce with increasing level of the input current such that the combined gains of the input stage and the first and second current mirrors remain substantially independent of the level of the input current.

9. A current sensing circuit as claimed in claim 8 wherein each of the first and second current mirrors comprises:

a first stage comprising an input transistor having first and second current electrodes and a control electrode, the second current electrode being coupled to the control electrode and to the input terminal, the first current electrode being coupled to a respective one of the first and second supply lines; and a second stage comprising an output transistor having first and second current electrodes and a control electrode, the control electrode being coupled to the input terminal, the first current electrode being coupled to a respective one of the first and second supply lines and the second current electrode being coupled to the output of the current sensing circuit.

10. A current sensing circuit as claimed in claim 9 wherein the offset means comprises:

a first input ballast resistor coupled between the first current electrode of the input transistor of the first current mirror and the first supply line; and a second input ballast resistor coupled between the first electrode of the input transistor of the second current mirror and the second supply line.

11. A current sensing circuit as claimed in claim 10 further comprising:

a first output ballast resistor coupled between the first current electrode of the output transistor of the first current mirror and the first supply line; and a second output ballast resistor coupled between the first electrode of the output transistor of the second current mirror and the second supply line.

12. A current sensing circuit as claimed in claim 8 wherein the input stage comprises:

a first transistor having first and second current electrodes and a control electrode, the first current electrode being coupled to the first input terminal, and the second current electrode being coupled to the first output terminal;

a second transistor having first and second current electrodes and a control electrode, the first current electrode being coupled to the first input terminal, and the second current electrode being coupled to the second output terminal;

a third transistor having first and second current electrodes and a control electrode, the first current electrode being coupled to the control electrode of the first transistor, the second current electrode being coupled to the second output terminal and the control electrode being coupled to the second input terminal; and a fourth transistor having first and second current electrodes and a control electrode, the first current electrode being coupled to the control electrode of the second transistor, the second current electrode being coupled to the first output terminal and the control electrode being coupled to the second input terminal.

13. A current sensing circuit according to claim 8 wherein the first current mirror has a second output terminal and the second current mirror has a second output terminal, wherein the circuit further comprises second combining means coupled to the second output terminals of the first and second current mirrors for combining the output signals at the second output terminals of the first and second current mirrors to provide the image output signal.

* * * * *